(12) United States Patent
Sidorin

(10) Patent No.: US 6,751,391 B2
(45) Date of Patent: Jun. 15, 2004

(54) OPTICAL SYSTEMS INCORPORATING WAVEGUIDES AND METHODS OF MANUFACTURE

(75) Inventor: Yakov Sidorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 58 days.

(21) Appl. No.: 09/912,832

(22) Filed: Jul. 24, 2001

(65) Prior Publication Data

US 2003/0021569 A1 Jan. 30, 2003

(51) Int. Cl.[7] ................................................ G02B 6/10
(52) U.S. Cl. ...................................................... 385/132
(58) Field of Search ............................ 385/132, 14–16, 385/11, 18, 40, 23–24, 31, 39, 45, 129–130, 124, 127, 131; 438/438, 766

(56) References Cited

U.S. PATENT DOCUMENTS

| | | | | |
|---|---|---|---|---|
| 5,656,181 A | * | 8/1997 | Biasse et al. | ................. 216/24 |
| 5,708,750 A | | 1/1998 | Kevorkian et al. | ......... 385/129 |
| 5,883,991 A | | 3/1999 | Funabashi | ..................... 385/39 |
| 5,911,018 A | * | 6/1999 | Bischel et al. | ................ 385/16 |
| 5,978,531 A | | 11/1999 | Funabashi | ..................... 385/45 |
| 6,174,425 B1 | * | 1/2001 | Simpson et al. | ............... 205/96 |
| 6,351,578 B1 | * | 2/2002 | Brinkman et al. | ............ 385/16 |

FOREIGN PATENT DOCUMENTS

| | | |
|---|---|---|
| WO | WO 00/45197 | 8/2000 |
| WO | WO 00/45481 | 8/2000 |

* cited by examiner

*Primary Examiner*—J. F. Duverne

(57) ABSTRACT

Methods for forming optical systems are provided. A representative method includes the steps of: providing a substrate; depositing on the substrate a first contoured channel preform of material capable of ion exchange with the substrate; and diffusing ions from the first channel preform into the substrate to form a first waveguide channel at least partially buried in the substrate. Optical systems and other methods also are provided.

10 Claims, 9 Drawing Sheets

OPTICAL SYSTEMS INCORPORATING WAVEGUIDES AND METHODS OF MANUFACTURE

BACKGROUND OF THE INVENTION

1. Field of the Invention

The present invention generally relates to optics. More specifically, the invention relates to systems and methods pertaining to optical waveguides.

2. Description of the Related Art

Optical communication systems are configured to propagate signals between various locations. Through at least a portion of such a communication system, the signals are provided as light that is propagated along an optical path. Numerous optical communication systems rely exclusively upon the transmission of single or lowest order mode light. For example, long distance and metro-range optical communication systems use single mode fiber. Single mode fiber offers a larger bandwidth than multi-mode fiber. This enables single mode fiber to propagate signals over greater distances than achievable with multi-mode fiber without the use of repeaters, for example.

Optical signals of a communication system using single mode fiber are often processed by various integrated optic devices. These integrated optic devices can include modulators, interferometers, distributed feedback elements, etc., all of which typically are based on planar waveguide technology.

At various locations along an optical path of a communication system, it may be desirable to reshape or scale the mode of light propagating along the optical path. For instance, mode typically is reshaped to satisfy mode-match requirements of optical components positioned along an optical path. For example, mode may be reshaped to accommodate a transition from an optical fiber to an integrated optic component. As used herein, the term "mode" refers to the spatial distribution of light relative to a cross-sectional area oriented normal to the optical path.

Transformation of modal properties through axial tapering of a dielectric waveguide is useful in several contexts. For example, mode-size transformation permits independent optimization of the mode size in different portions of the waveguide for effective input and output coupling. Mode-size transformation also can be used to obtain a narrow far-field of the outcoupled modes. An adiabatic taper from a single-mode to a multi-mode waveguide also permits robust coupling into the fundamental mode of a multi-mode waveguide. This is important in certain types of nonlinear waveguide devices that involve interactions between modes at widely separated wavelengths.

A prior art solution for mode matching uses an optical fiber and a micro-lens, e.g., a spherical lens or gradient index lens. The optical fiber and micro-lens allow for collection of light from the output component, e.g., an output fiber. The optical fiber and micro-lens also provide input coupling of light into the input component, e.g., an input fiber. Typical disadvantages of using such a solution include design difficulties in providing components that are configured to receive the input mode and provide an appropriately reshaped output mode.

Tapered optical fibers also have been used to reshape mode. A tapered optical fiber includes one or more tapered portions, i.e., portions that have cross-sectional areas that vary along their respective lengths. The tapered portions of these fibers typically are formed by controlled incremental heating. For instance, by heating a portion of a fiber, the fiber core tends to expand, thus resulting in a localized increase in cross-sectional area of the fiber. Simultaneous heating and pulling of the fiber results in a reduction of cladding and core dimensions. A potential disadvantage of using tapered optical fibers includes decreased mechanical strength of the fiber.

Additionally, integrated optic waveguides with continuous tapers and segmented tapers have been used for reshaping mode. As used herein, the term "segmented taper" refers to a waveguide taper that is composed of or divided into portions with different optical properties that are defined by dielectric boundaries. These dielectric boundaries are formed between the waveguide portions and portions of the substrate material, as viewed along the axis of light propagation. The term "continuous taper" refers to a waveguide taper in which light, upon its propagation, does not traverse dielectric boundaries between the waveguide portions and portions of the substrate material. Thus, in a waveguide with continuous taper, the taper changes its optical properties in a continuous and adiabatic fashion.

Waveguides with segmented tapers are capable of providing two-dimensional mode tapering. However, these waveguides typically are lossy due to the multiple dielectric boundaries formed between the segmented waveguide portions. In addition, precise control of segmentation is technologically involved. Therefore, it can be appreciated that there is a need for systems and methods that address these and/or other shortcomings of the prior art.

SUMMARY OF THE INVENTION

Optical systems and methods of the present invention relate to optical waveguides. A representative optical system of the invention includes a substantially planar substrate and an elongate, two-dimensionally tapered waveguide channel at least partially buried in the substrate.

A representative method for forming an optical system includes: providing a substrate; depositing on the substrate a contoured channel preform of material capable of ion exchange with the substrate; and diffusing ions from the channel preform into the substrate to form a waveguide channel at least partially buried in the substrate.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
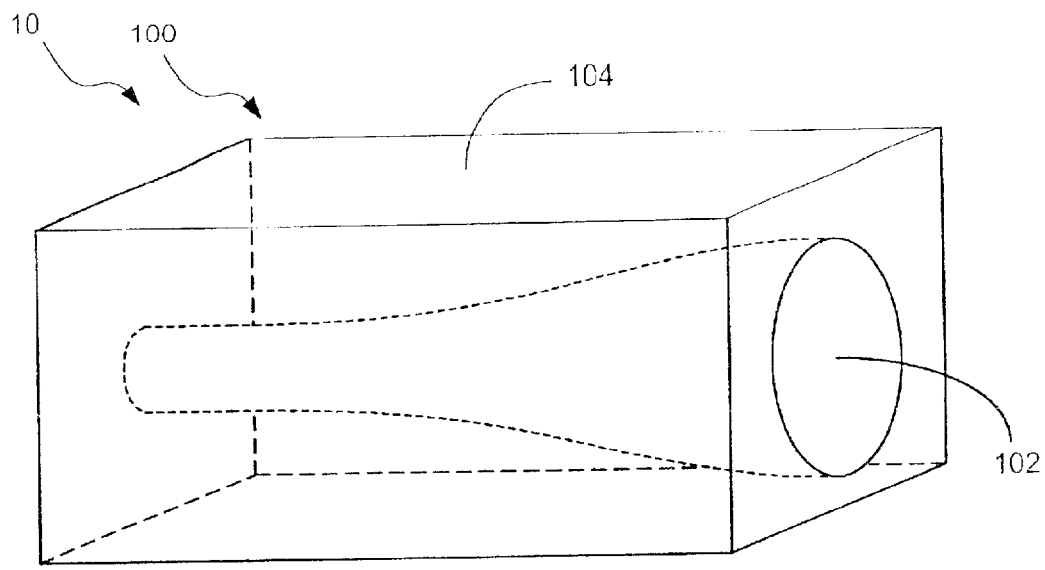
FIG. 1 is a schematic diagram of a representative embodiment of an optical waveguide of the present invention.

Referring now to the figures, wherein like reference numerals indicate corresponding components throughout the several views, FIG. 1 schematically depicts a representative embodiment of an optical system 10 that incorporates a waveguide component 100. Waveguide component 100 includes a waveguide channel 102 that is buried, at least partially, in a substrate 104, i.e., at least a portion of the waveguide channel does not intersect an exterior surface of the substrate. More specifically, waveguide channel 102 is defined by a presence of ions in a region of the substrate. The ions that define the waveguide channel are provided, at least in part, by a channel preform that includes material capable of exchanging ions with the substrate. As described in greater detail below, the channel preform is applied to a surface of the substrate prior to waveguide channel formation.

Figure 2:
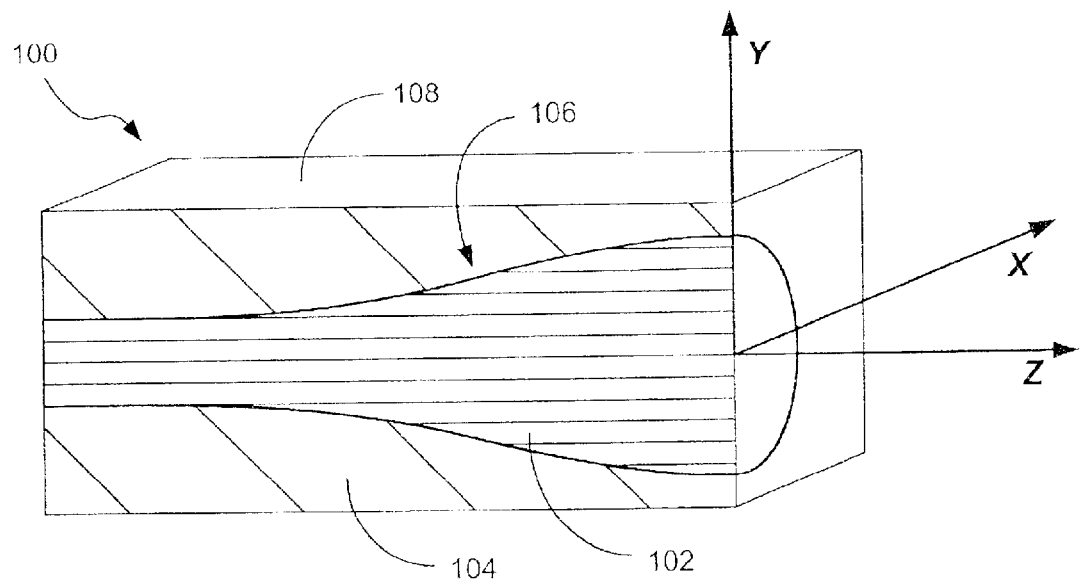
FIG. 2 is a cross-sectional view of the embodiment of FIG. 1.

Waveguide component 100 of FIG. 1 is shown in greater detail in the cross-sectional view of FIG. 2. In FIG. 2, waveguide channel 102 clearly exhibits a change in cross-sectional area along at least a portion of its length. In particular, a tapered portion 106 of the waveguide channel exhibits a simultaneous taper in two dimensions. That is, tapered portion 106 exhibits a change in height (a change in dimension relative to the y axis) and a change in width (a change in dimension relative to the x axis). Unlike the embodiment of FIGS. 1 and 2, which lacks continuous rotational symmetry about its optical axis, other embodiments can exhibit continuous rotational symmetry. Additionally, although the height and width of the tapered portion depicted in FIGS. 1 and 2 both change from narrow to broad in concert, other tapered portions can be formed where one of the height and width narrows as the other broadens.

Waveguide channel 102 also exhibits a continuous taper. More specifically, waveguide channel 102 lacks one or more interfaces between the material of substrate 104 and the material of waveguide channel 102 along the optical path. Also, waveguide channel 102 is a buried waveguide, ie., no intermediate portion of the waveguide channel intersects an exterior surface 108 of the substrate.

The buried, two-dimensional, continuous taper of waveguide channel 102 of FIGS. 1 and 2 potentially offers one or more advantages over known waveguide designs. For instance, compared to segmented-taper waveguides, waveguide component 100 tends to reduce or prevent unwanted reflections along the optical path. This is because the continuously tapered configuration lacks interfaces between the material of substrate 104 and the material of waveguide channel 102 along the optical path. Additionally, compared to non-buried waveguides, waveguide component 100 potentially provides lower attenuation loss. More specifically, since the mode of waveguide component 100 is positioned away from the surface 108 of substrate 104, the loss component of the waveguide attributable to scattering of the waveguide mode at the boundary defined by surface 108 is reduced.

Figure 3:
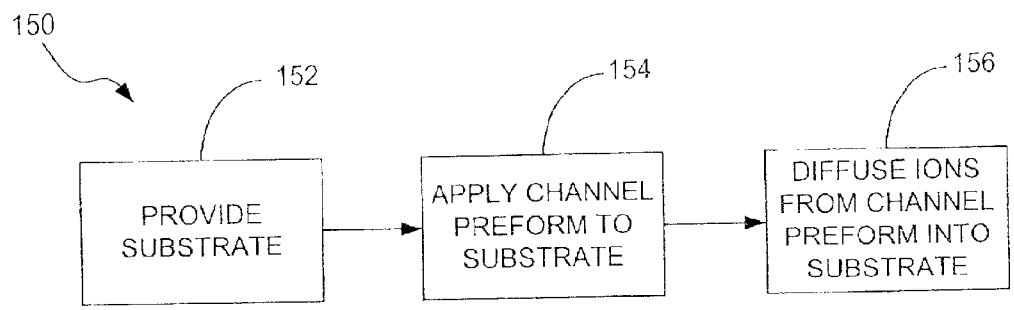
FIG. 3 is a flowchart depicting a representative method for forming the to embodiment of FIG. 1.

A representative method for forming waveguide component 100 will now be described with reference to the flowchart of FIG. 3. In FIG. 3, method 150 includes providing a substrate and applying a channel preform to the substrate (blocks 152 and 154). As described below, the substrate and channel preform constitute a waveguide-forming structure. Ions from the channel preform are then diffused into the substrate so that a waveguide channel, which is at least partially buried in the substrate, is formed (block 156). A representative waveguide-forming structure that can be used to form the waveguide component 100 of FIGS. 1 and 2 is depicted in FIG. 4.

Figure 4:
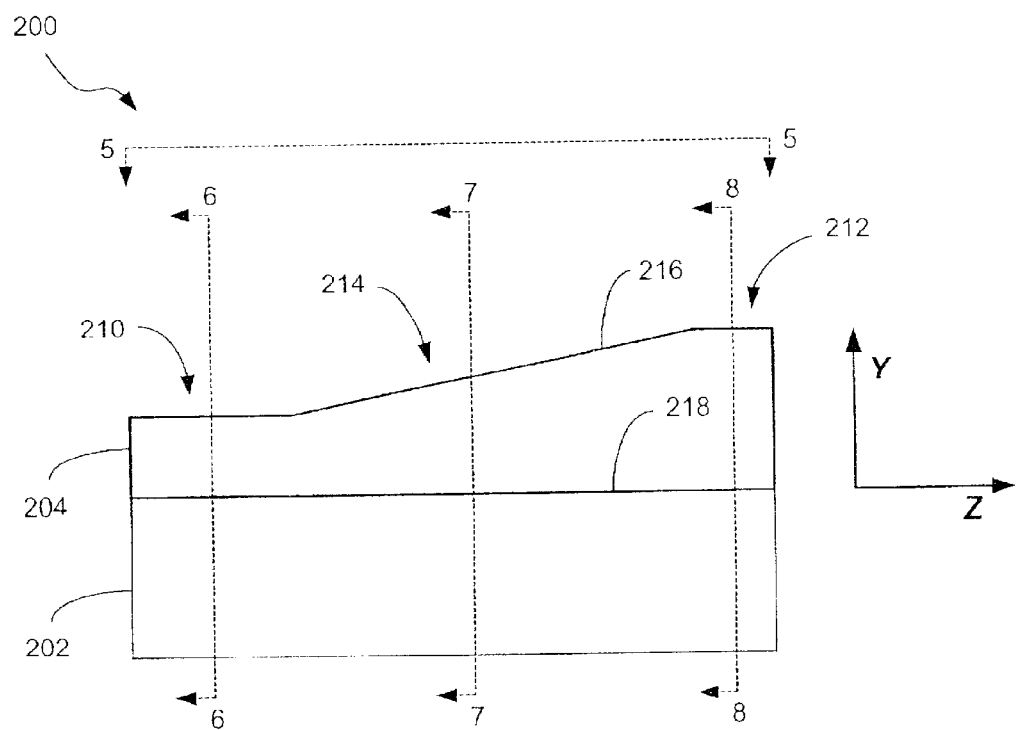
FIG. 4 is a schematic, side view of a representative substrate and channel preform used to form the embodiment of FIG. 1.

Waveguide-forming structure 200 of FIG. 4 includes a substrate 202 and a channel preform 204. In FIG. 4, substrate 204 is depicted as a substantially planar substrate. It should be noted, however, that various other shapes of substrates can be used. Channel preform 204, which approximates the shape of the ultimate waveguide channel, can be applied to the substrate by various techniques. For instance, a material deposition process can be used.

Figure 5:
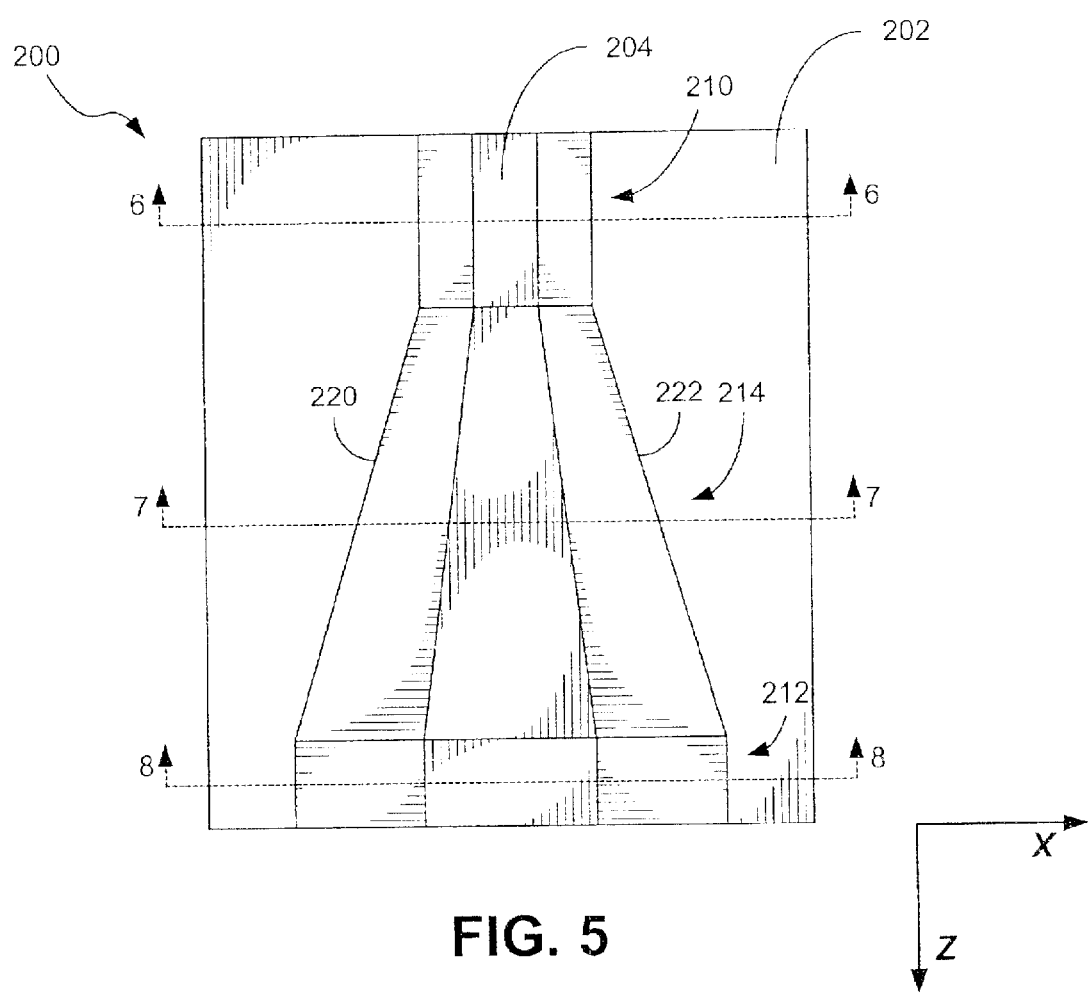
FIG. 5 is a schematic, plan view of the embodiment of FIG. 4.

As shown in FIGS. 4 and 5, channel preform 204 includes a first end portion 210 and a second end portion 212. The first and second end portions exhibit generally uniform cross-sectional areas, i.e., areas in the x-y plane, along their respective lengths. An intermediate portion 214 is arranged between the first and second end portions. Intermediate portion 214 is a generally wedge-shaped structure (as viewed in the side cross-section of FIG. 3). More specifically, intermediate portion 214 includes an upper surface 216 that is inclined relative to an upper surface 218 of substrate 202. The inclined upper surface of intermediate portion 214 generally corresponds to the taper in they dimension of tapered portion 106 of waveguide channel 102 (FIGS. 1 and 2).

Intermediate portion 214 also is defined by sidewalls 220 and 222. As viewed along the z axis from first end portion 210 to second end portion 212, sidewalls 220 and 222 angle outwardly from each other. The sidewalls 220 and 222 of intermediate portion 214 generally correspond to the taper in the x dimension of tapered portion 106 of waveguide channel 102 (FIGS. 1 and 2).

Figure 6:
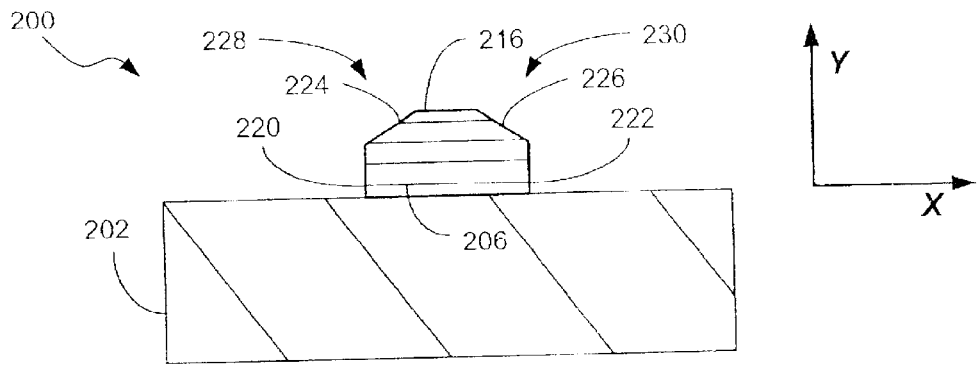
FIG. 6 is a cross-sectional view of the embodiment of FIG. 5 taken along section line 6—6.
Figure 7:
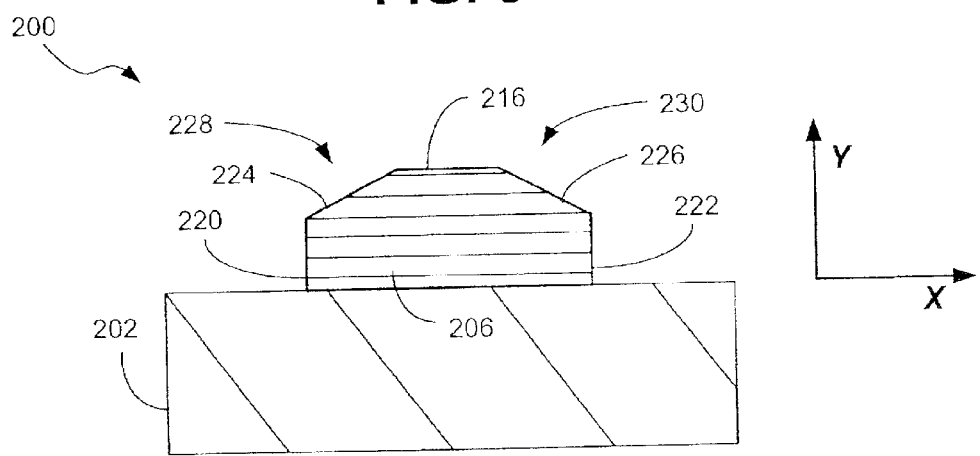
FIG. 7 is a cross-sectional view of the embodiment of FIG. 5 taken along section line 7—7.
Figure 8:
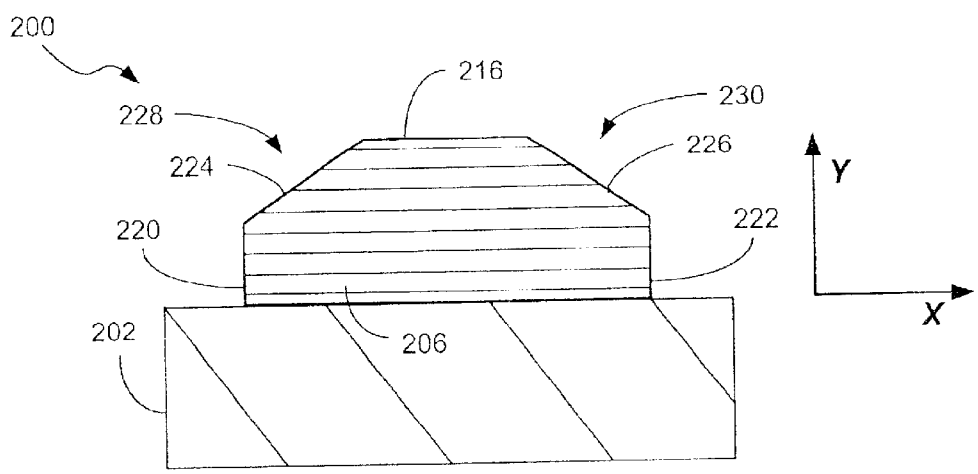
FIG. 8 is a cross-sectional view of the embodiment of FIG. 5 taken along section line 8—8.

Cross-sections of waveguide-forming structure 200 are depicted in FIGS. 6–8. As shown in FIGS. 6–8, channel preform 204 is partially defined by inclined sidewalls 224 and 226. Inclined sidewalls 224 and 226 extend upwardly from sidewalls 220 and 222, respectively, and terminate at upper surface 216. Thus, the inclined sidewalls extend inwardly from the sidewalls to form beveled portions 228 and 230 of the channel preform. Improved circularity of the mode propagated through a waveguide formed from waveguide-forming structure 200, for example, can be attributed, at least in part, to this beveled configuration.

It should be noted that the shapes of actual channel preforms used to form waveguide channel similar to those depicted in FIGS. 1 and 2 may only approximate the shapes depicted in FIGS. 4 through 8. For instance, due to material and/or manufacturing limitations, channel preform 204 may be formed by multiple, sequentially applied, deposition layers of material. Thus, sidewalls of the actual channel preform may exhibit stepped exterior surfaces in contrast to the smooth exterior surfaces depicted. In order to obtain a channel preform with smoother exterior surfaces, which may be preferred in some applications, a deposition technique known in the art as "shadow masking" can be used.

Embodiments of waveguides can be formed with channel preforms that are shaped differently than those depicted in FIGS. 4–8. By way of example, channel preforms can exhibit cross-sectional areas of various shapes, such as rectangular. Additionally, channel preforms may vary in thickness along at least a portion of their respective lengths in either or both of width (x) and height (y). In some embodiments, a channel preform can be formed of multiple preform segments. For instance, such a channel preform could include multiple preform segments that are arranged in tandem and/or in a side-by-side relationship for forming a single waveguide channel.

By using one or more channel preforms to form a waveguide channel 102, various types of waveguides can be provided. For example, tapering of a waveguide channel 102 may be continuous or segmented. Additionally, tapering may occur in one dimension or in two dimensions, eg., simultaneously or independently tapering in height and width. Regardless of the particular shape of the waveguide channel, the waveguide channel exhibits a refractive index that is higher than that the corresponding substrate. Therefore, light entering the waveguide channel tends to propagate along an optical path defined by the waveguide channel.

Figure 9:
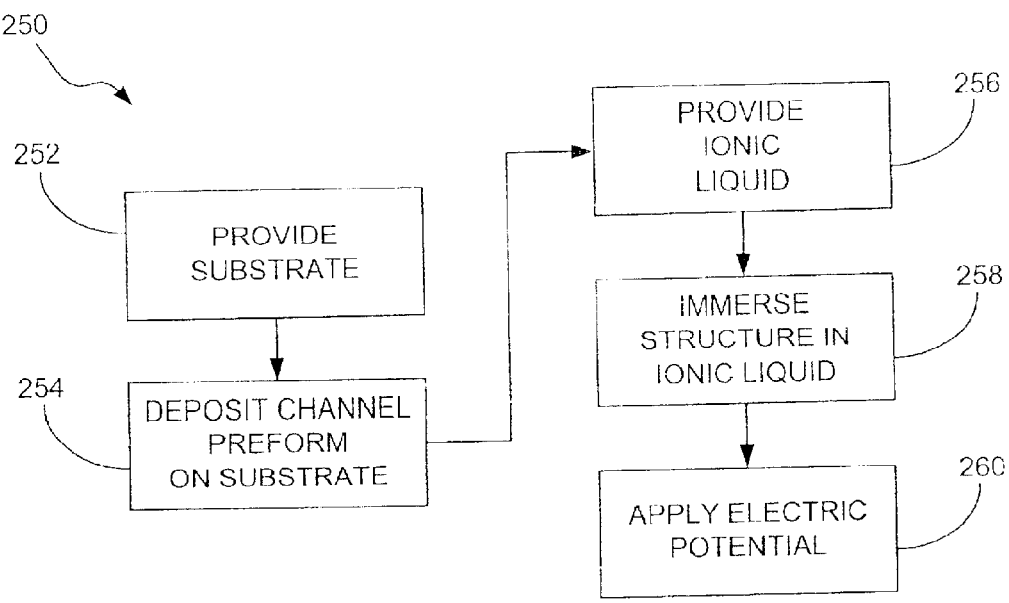
FIG. 9 is a flowchart depicting a representative method for forming the embodiment of FIG. 1.

Another representative method for forming a waveguide component, e.g., waveguide component 100 of FIG. 1, will now be described with reference to the flowchart of FIG. 9. As depicted in FIG. 9, method 250 includes providing a substrate and depositing a channel preform on the substrate (blocks 252 and 254). This yields a waveguide-forming structure, e.g., waveguide forming structure 200 of FIG. 3. In block 256, an ionic liquid is provided. The waveguide-forming structure is immersed in the ionic liquid (block 258) so that a first portion of the liquid engages the channel preform and a second portion of the liquid engages the substrate. An electric potential then is applied across the first portion and the second portion of the ionic liquid (block 260) so that ions from the channel preform diffuse into the substrate to form a waveguide channel.

Substrates used to form waveguide components of the invention, such as by the representative method depicted in FIG. 9, can be formed of various materials. By way of example, various glass compositions may be used. More specifically, substrates can be formed of chalcogenide glasses, halide glasses, phosphate glasses, boroaluminosilicate glasses, and tellurite glasses, among others.

Additionally, embodiments may utilize glasses doped with active rare-earth ions, such as $Er^{3+}$, $Tm^{3+}$, and $Nd^{3+}$, for example. Active ions can be used to obtain optical signal amplification in different spectral regions, e.g., active ions are used in fabrication of fiber or waveguide amplifiers.

Other materials used in integrated optics can be used as substrates depending on the requirements of a particular application. For instance, a substrate material may be chosen for particular material properties, such as optical loss, active characteristics, mechanical stability, compatibility with high-volume batch processing techniques, and cost, among others. A substrate material also may be chosen for particular application suitability, such as intended spectral range of operation. Additional examples of potentially suitable substrates include semiconductor crystals, e.g., $A^{II} B^{IV}$, $A^{III} B^{V}$, dielectric crystals, such as Lithium Niobate and KTP, and organic compounds.

Waveguide channels, such as waveguide channel 102 of FIGS. 1 and 2, also can be formed from various materials. More specifically, various materials that are capable of exchanging ions with the material of the substrate can be used to form a waveguide channel. The ions used to form such a waveguide channel can be provided from a channel preform and/or an ionic liquid. By way of example, monovalent cations, such as Silver ($Ag^+$), Lithium ($Li^+$), Potassium ($K^+$), Rubidium ($Rb^+$), Cesium ($Cs^+$), and Thallium ($Tl^+$) can be used to exchange ions with the substrate. For instance, when the substrate comprises glass containing $Na_2O$, $Na^+$ present in the glass can be exchanged with the monovalent cations. More specifically, $Na^+$ present in the glass can be exchanged with $Ag^+$ from a channel preform containing Silver and $Na^+$ from an ionic liquid of Sodium Nitrate. Furthermore, in the presence of an electric field(s), waveguides can be obtained by diffusion of monovalent as well as bivalent cations, such as Zinc ($Zn^{2+}$). By way of another example, the exchange between three ions can proceed simultaneously when a substrate contains one type of alkali cations and the ion source involves alkali cations of two types, and vice versa. The selection of substrate, channel preform and/or ionic liquid materials can be based on known material properties and the requirements of a particular application as would be known to one of ordinary skill in the art.

Figure 10:
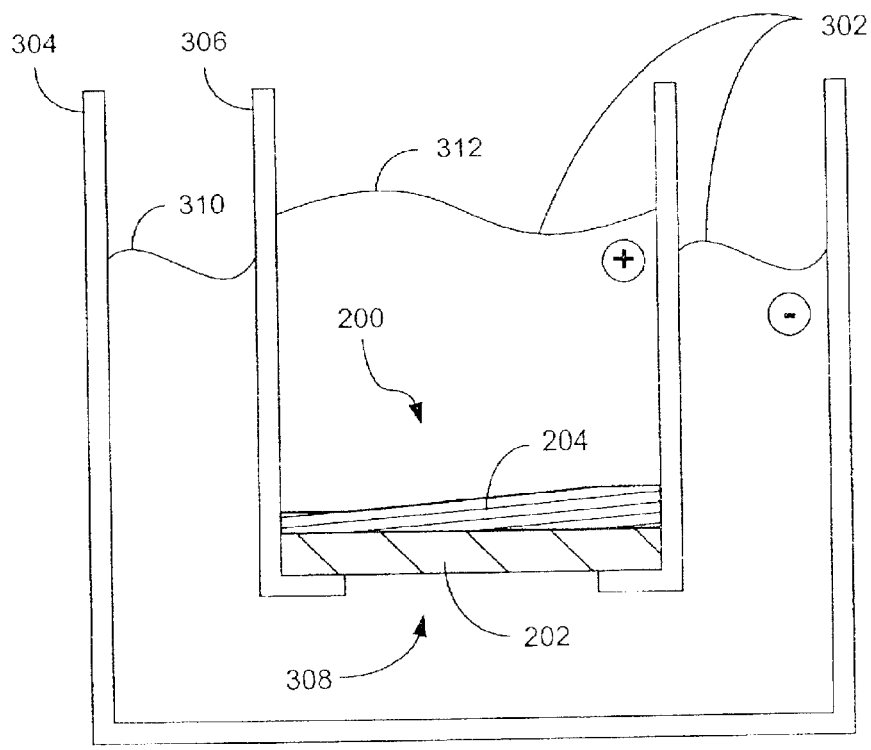
FIG. 10 is a schematic diagram of a representative apparatus that can be used for forming the embodiment of FIG. 1.

FIG. 10 schematically depicts a representative apparatus 300 that can be used to implement the method of FIG. 9. In FIG. 10, ionic liquid 302 is provided in a container 304 of apparatus 300. In some embodiments, the ionic liquid can include a salt, such as Sodium Nitrate ($NaNO_3$), that is maintained in a molten state. Preferably, the material(s) forming the ionic liquid are maintained at or above a temperature that is required to maintain the material(s) in liquid form. For example, Sodium Nitrate ($NaNO_3$) should be maintained at or above approximately 307° C.

Apparatus 300 also includes a support structure 306 that is adapted to suspend waveguide-forming structure 200 within the ionic liquid. In the embodiment of FIG. 10, support structure 306 defines an opening 308. Opening 308 permits a first portion 310 of the ionic liquid to contact substrate 202 and a second portion 312 of the ionic liquid to contact channel preform 204.

An electric potential is applied across the waveguide-forming structure 200 via the ionic liquid. This causes ions of the channel preform to indiffuse to the substrate. Burial of the ions that form the channel preform begins when ions of the ionic liquid, e.g., $Na^+$, start to re-build the matrix of the substrate above the channel preform. This process is referred to as "one-step field-assisted ion-exchange using the solid source of ions and molten-salt electrodes." For convenience, the term "one-step field-assisted ion-exchange fabrication" is used herein.

One-step field-assisted ion-exchange fabrication is considered an improvement over the teachings of Pantchev. See, *Multimode Strip Waveguide Formed by Ion-Electro-Diffusion from Solid State Silver: Side Diffusion Reduction*, B. Pantchev, Optics Communications, v.60, p.373, 1986, which is incorporated by reference herein. Compared to Pantchev's fabrication technique, the one-step field-assisted ion-exchange fabrication technique simplifies waveguide fabrication. More specifically, the only deposition steps required are those associated with applying the channel preform 204 to the substrate 202. Moreover, the waveguide is formed and, at least partially, buried during a single process step.

Perceived enhancements over Pantchev may be attributed to various causes. For instance, the one-step field-assisted ion-exchange fabrication technique enables application of a substantially uniform electric field over the entire substrate. Additionally, the large heat mass associated with the molten salt reduces the potential of the waveguide-forming structure from being subjected to substantial temperature variations during processing. The one-step field-assisted ion-exchange fabrication technique also tends to reduce side-diffusion of ions of the channel preform. Thus, lateral broadening of the material, e.g., broadening in the x-y plane, during indiffusion is reduced. As a result, more circular modes have been demonstrated. This characteristic should enhance waveguide to fiber coupling.

Figure 11:
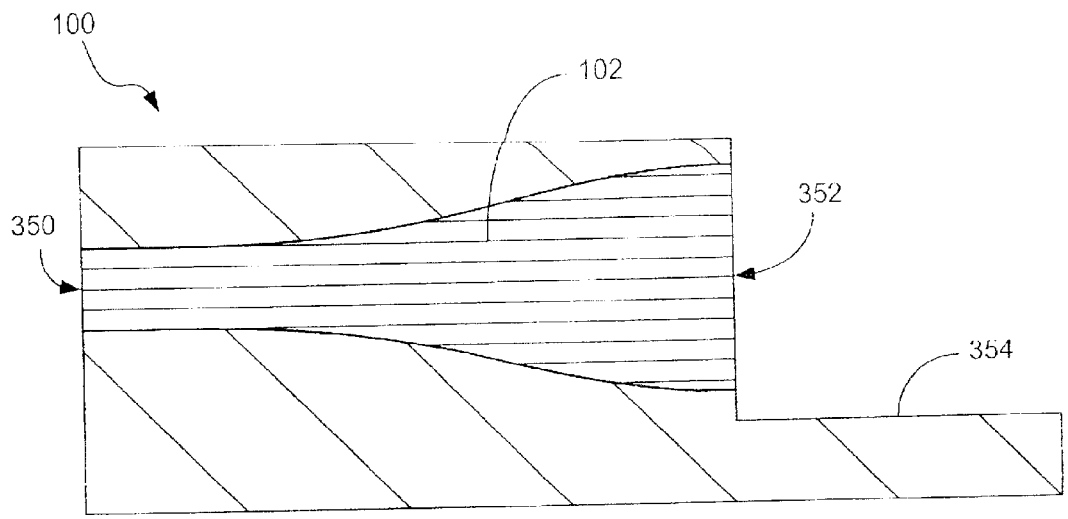
FIG. 11 is a schematic diagram of an embodiment of the invention that incorporates a locating contour.

A representative example of a waveguide component 100 that can be formed by the one-step field-assisted ion-exchange fabrication technique is depicted in FIG. 11. Waveguide component 100 incorporates a waveguide channel 102 that includes a first end 350 and a second end 352. The first end and second end can function as input and output, respectively, or vice versa. In the embodiment of FIG. 11, the first and second ends are generally planar in shape and are oriented substantially orthogonal to the optical path of the waveguide channel. In other embodiments, the ends can take on various other shapes and/or orientations.

Figure 12:
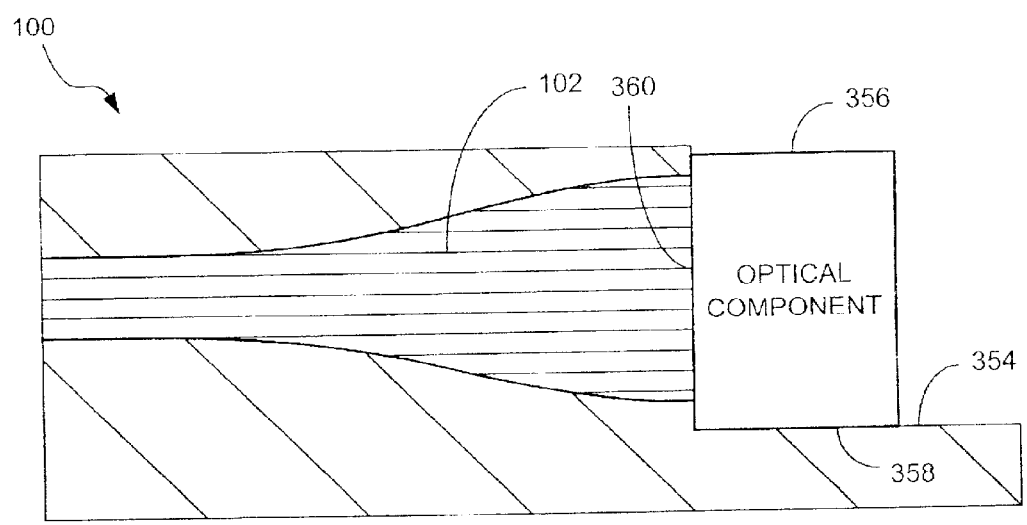
FIG. 12 is a schematic diagram of the embodiment of FIG. 11, showing detail of a representative optical component aligned with the optical path of the waveguide channel.

Waveguide component 100 of FIG. 11 also includes a locating contour 354. The locating contour facilitates alignment of an optical component(s) with the optical path of the waveguide channel. For instance, FIG. 12 depicts a representative optical component 356 that is aligned with the optical path of waveguide channel 102. Alignment can be achieved by engaging a surface, e.g., surface 358, of optical component 356 with the locating contour 354. In this embodiment, further alignment is achieved by engaging an additional surface, i.e., surface 360, of the optical component with the second end 352 of the waveguide channel.

Figure 13:
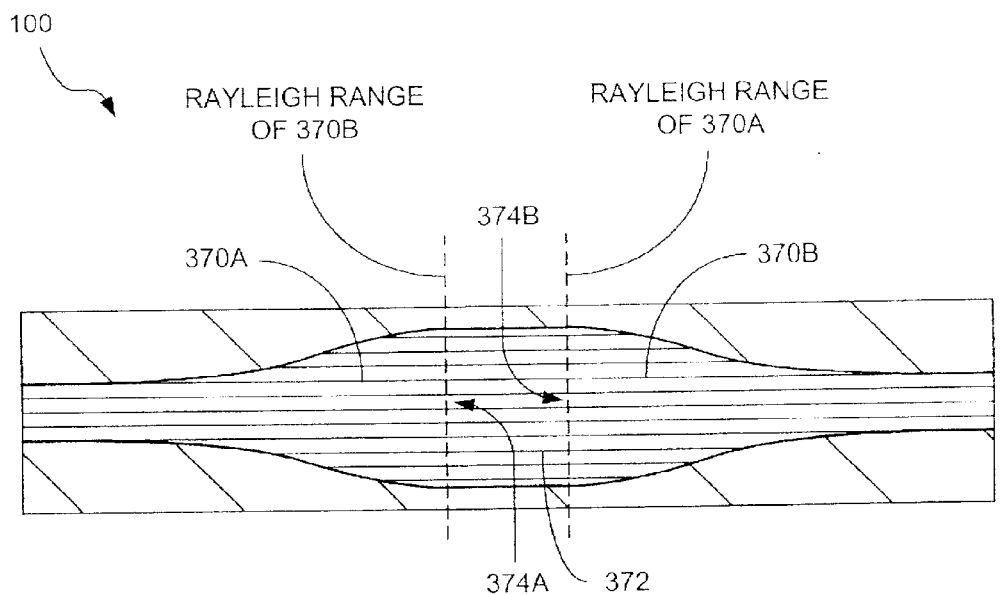
FIG. 13 is a schematic diagram of an embodiment of the invention that incorporates multiple waveguide channels.

Another representative embodiment of a waveguide component 100 is depicted in FIG. 13. In FIG. 13, waveguide component 100 incorporates a waveguide channel 102 that includes multiple tapered channel portions. In particular, waveguide channel 102 includes tapered channel portions 370A, 370B that are arranged in tandem. A linking portion 372 is located between the tapered channel portions. Linking portion is defined by a region of ions present in the substrate that interconnects the tapered channel portions. In some embodiments, the tapered channel portions and the linking portion can be formed from a single contoured channel preform.

In the embodiment of FIG. 13, linking portion 372 is a non-tapered portion of the waveguide channel that is sized and shaped to accommodate the formation of a trench. As described later, the trench should be sized to receive one or more optical components. Material to be removed from linking portion 372 to form such a trench may be removed by etching or any other suitable removal process.

In FIG. 13, each tapered channel portion is configured to propagate collimated light from its second end, i.e., ends 374A, 374B. Typically, linking portion 372 is defined within the partially overlapping Rayleigh ranges of the tapered portions so that removal of at least a portion of the linking portion does not disrupt propagation of collimated light between the tapered portions. Preferably, the length of the linking portion is established to accommodate the manufacturing tolerance associated with forming the trench so that collimated outputs of the tapered portions are not disturbed after trench formation. In this manner, a trench can be formed at various locations along the length of the linking portion.

Figure 14:
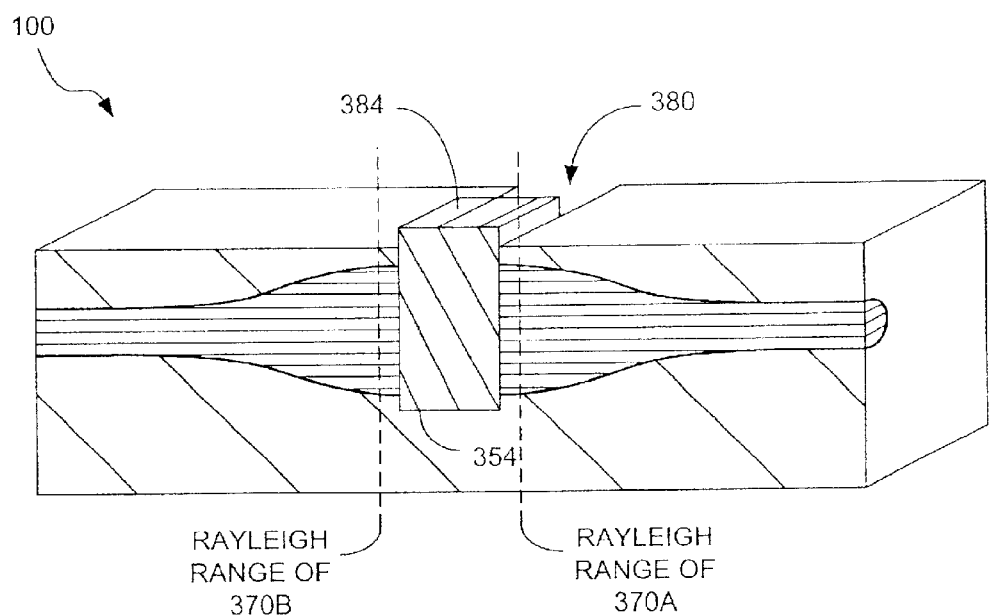
FIG. 14 is a schematic diagram of a representative integrated optical component that can be formed from the embodiment of FIG. 13.

In FIG. 14, a portion of the linking portion 372 and surrounding substrate has been removed to form a trench 380. Trench 380 is partially defined by locating contour 382. As shown in FIG. 14, trench 380 is sized to receive one or more optical components. In particular, trench 380 is depicted as at least partially receiving an optical component 384. Optical component 384 can include one or more of various elements including rotators, beamsplitters, re-routers, isolators, reflectors, refracting elements, diffracting elements, filters, and circulators. Thus, waveguide component 100 and optical component 384 can function as an integrated optical beamsplitter (polarizing or non-polarizing), isolator, distributed Bragg reflector, circulator, rotator, or filter (polarizing or non-polarizing), for example.

Figure 15:
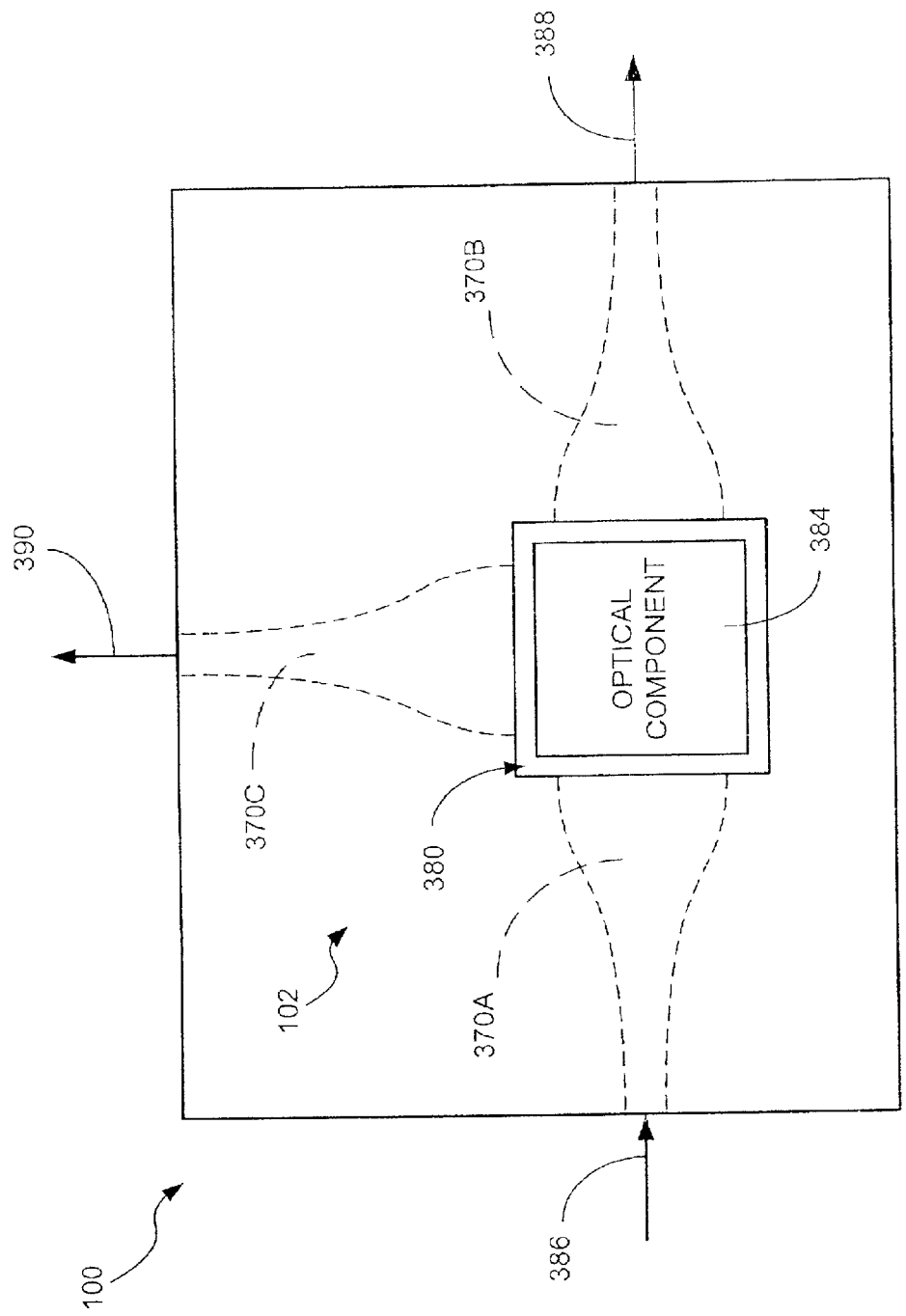
FIG. 15 is a schematic diagram of an embodiment of the invention that incorporates multiple waveguide channels.

Another representative embodiment of a waveguide component 100 is depicted in FIG. 15. Waveguide component 100 of FIG. 15 incorporates a waveguide channel 102 that includes multiple tapered channel portions 370A, 370B, 370C. In some embodiments, the channel portions 370A, 370B, 370C can be formed from a single channel preform. Each of the tapered channel portions optically communicates with a trench 380. Trench 380 is adapted to receive, at least partially, an optical component 384. For instance, optical component 384 can be a polarizing beamsplitter. In such an embodiment, light of an arbitrary polarization (depicted by arrow 386) can be propagated to the polarizing beamsplitter via channel portion 370A. The beamsplitter directs light of a first polarization to one of the remaining waveguide channels, e.g., channel portion 370B. Light of the first polarization is then propagated from channel portion 370B (depicted by arrow 388). Light of a second polarization, which is orthogonal to the first polarization, is directed to the other channel portion, e.g., channel portion 370C. Light of the second polarization is then propagated from channel portion 370C (depicted by arrow 390). In this manner, the waveguide component of FIG. 15 can function as a polarizing integrated optic re-router.

The embodiment of FIG. 15 can be adapted to receive a single light input and, in response to the input, provide either a single output or multiple, e.g., simultaneous, outputs. Alternatively, the waveguide component can be adapted to receive multiple inputs and, in response to the inputs, provide a single output.

The one-step field-assisted ion-exchange fabrication technique of the invention also can be used to form an array of waveguides. More specifically, multiple waveguide channels can be formed on a single substrate. This is accomplished by applying multiple channel preforms to the substrate and indiffusing ions of the channel preforms to the substrate to form the waveguide channels. Thus, embodiments of the invention are considered batch-processing and array-configuration compatible. This can significantly reduce the cost of waveguide device fabrication, for example.

Figure 16:
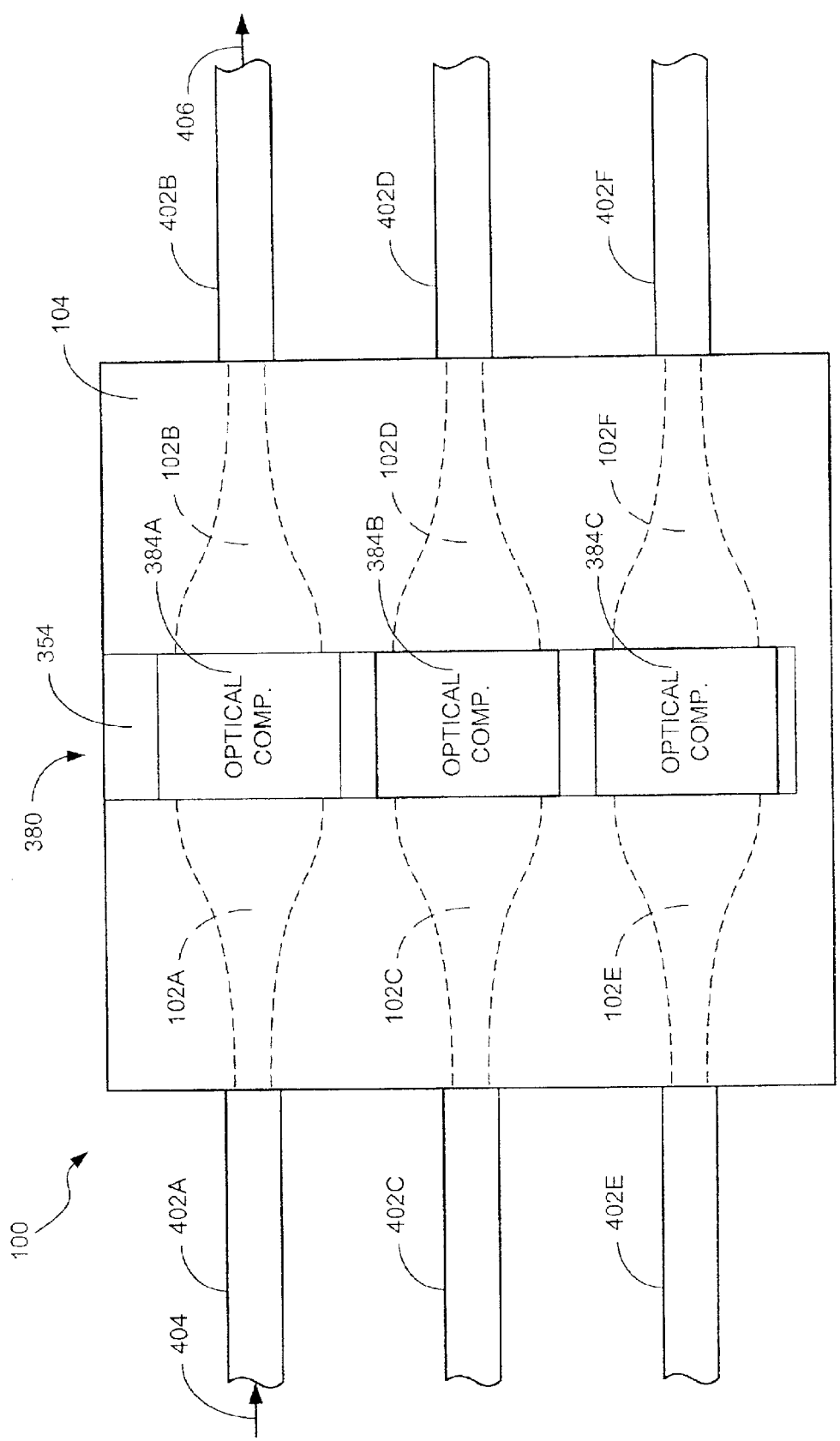
FIG. 16 is a schematic diagram of an embodiment of the invention that incorporates multiple waveguide channels.

A representative embodiment of a waveguide array 400 that includes multiple waveguide channels is depicted in FIG. 16. In FIG. 16, array 400 includes waveguide channels 102A, 102B, 102C, 102D, 102E and 102F formed on a substrate 104. The waveguide channels are arranged in pairs, with the waveguide channels of each pair being arranged in tandem. In other embodiments, other numbers of waveguide channels can be provided.

Each of the waveguide channels communicates with a transmission medium, such as an optical fiber or other optical component. More specifically, waveguide channel 102A communicates with transmission medium 402A, waveguide channel 102B communicates with transmission medium 402B, waveguide channel 102C communicates with transmission medium 402C, waveguide channel 102D communicates with transmission medium 402D, waveguide channel 102E communicates with transmission medium 402E, and waveguide channel 102F communicates with transmission medium 402F.

A trench 380 is located between the waveguide channels of each tandem pair. Trench 380 is defined, at least in part, by locating contour 354. Trench 380 is sized to receive one or more optical components and, in the embodiment of FIG. 16, spans between the multiple tandem pairs of waveguide channels. In other embodiments, a separate trench can be formed between each or a subset of the tandem pairs of waveguide channels.

In FIG. 16, trench 380 at least partially receives optical components 384A, 384B and 384C. Each of the optical components optically communicate with a respective tandem pair of waveguide channels. Thus, an optical signal (depicted by arrow 404) can be propagated to waveguide channel 102A via transmission medium 402A, through optical components 384A and 384B, and then to transmission medium 402B (depicted by arrow 406), or vice versa.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated.

By way of example, field-assisted ion-exchange methods other than the one-step field-assisted ion-exchange fabrication technique disclosed here are known in the art. These other field-assisted ion-exchange methods can be used to form various optical systems disclosed and/or claimed herein. Additionally, the representative embodiments depicted herein are shown with inputs at the ends of the waveguide channels exhibiting the smaller cross-sectional areas. However, either end of a waveguide channel may be used as an input as determined by the mode-matching requirements of a particular application. Moreover, in some embodiments, a waveguide channel may not include a tapered portion. All such modifications and variations, are within the scope of the invention as determined by the appended claims when interpreted in accordance with the breadth to which they are fairly and legally entitled.

What is claimed is:

1. A method for forming an optical system, said method comprising:

providing a substrate;

depositing on the substrate a first contoured channel preform of material capable of ion exchange with the substrate; and diffusing ions from the first channel preform into the substrate to form a first waveguide channel at least a portion of which is at least partially buried in the substrate, wherein diffusing ions from the first channel preform into the substrate comprises:

providing an ionic liquid;

immersing the substrate with the deposited first channel preform in the ionic liquid such that a first portion of the ionic liquid engages the first channel preform and a second portion of the ionic liquid engages the substrate; and applying an electric potential across the first portion and the second portion of the ionic liquid such that ions from the first channel preform diffuse into the substrate.

2. The method of claim 1, wherein in depositing the first channel preform, the first channel preform is contoured with a varying width.

3. The method of claim 1, wherein in depositing the first channel preform, the first channel preform is contoured with a varying height.

4. The method of claim 1, wherein in depositing the first channel preform, the first channel preform is contoured with both a varying width and height; and wherein in diffusing ions from the first channel preform into the substrate, the first waveguide channel at least partially buried in the substrate is formed as an elongate, two-dimensionally tapered waveguide channel.

5. The method of claim 1, wherein the step of providing a substrate comprises providing a substrate comprising sodium cations; and wherein the step of providing an ionic liquid comprises providing a melt comprising sodium nitrate.

6. The method of claim 1, further comprising:

removing a portion of the first waveguide channel to form a trench, the trench being configured to receive an optical element; and arranging an optical element at least partially within the trench, the optical element being configured to communicate optically with the first waveguide channel.

7. The method of claim 1, further comprising:

optically coupling an input transmission medium to the first waveguide channel, the input transmission medium being configured to propagate light to the first waveguide channel; and optically coupling an output transmission medium to the first waveguide channel, the output transmission medium being configured to propagate light from the first waveguide channel.

8. A waveguide component formed by the process of claim 1.

9. The method of claim 1, further comprising:

depositing on the substrate a second contoured channel preform of material capable of ion exchange with the substrate; and diffusing ions from the second channel preform into the substrate to form a second waveguide channel at least partially buried in the substrate.

10. The method of claim 9, further comprising:

forming a trench along a light propagation path between the first waveguide channel and the second waveguide channel, the trench being configured to receive an optical element; and arranging an optical element at least partially within the trench, the optical element being configured to communicate optically with the first waveguide channel and the second waveguide channel.

* * * * *